(12) United States Patent
Nevada

(10) Patent No.: US 9,727,908 B2
(45) Date of Patent: Aug. 8, 2017

(54) METHOD AND SYSTEM TO ENHANCE PRESENTATION OF A SHARED RESOURCE

(71) Applicant: PayPal, Inc., San Jose, CA (US)

(72) Inventor: Giselle Katrina Nevada, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 409 days.

(21) Appl. No.: 13/683,200

(22) Filed: Nov. 21, 2012

(65) Prior Publication Data

US 2014/0143098 A1    May 22, 2014

(51) Int. Cl.
*G06Q 30/00* (2012.01)
*G06Q 30/06* (2012.01)

(52) U.S. Cl.
CPC .............................. *G06Q 30/0643* (2013.01)

(58) Field of Classification Search
CPC .................................................. G06Q 30/0643
USPC ........................................................ 705/27.2
See application file for complete search history.

(56) References Cited

U.S. PATENT DOCUMENTS

| | | | | |
|---|---|---|---|---|
| 2002/0147645 A1* | 10/2002 | Alao | ................... | G06Q 30/0209 705/14.54 |
| 2003/0095141 A1* | 5/2003 | Shah | ................... | G06F 9/44505 715/735 |
| 2003/0195822 A1* | 10/2003 | Tatge | ................. | G06Q 30/0226 705/37 |
| 2004/0049739 A1* | 3/2004 | McArdle | ................ | G06Q 10/06 715/229 |
| 2006/0265394 A1* | 11/2006 | Raman | .............. | G06F 17/30867 |
| 2007/0078726 A1* | 4/2007 | MacDonald Korth | | G06Q 10/06 705/26.1 |
| 2013/0124980 A1* | 5/2013 | Hudson | ................... | G06F 17/21 715/243 |
| 2013/0259297 A1* | 10/2013 | Knudson | ........... | G06F 17/30244 382/103 |
| 2014/0025531 A1* | 1/2014 | Nachiappan | ....... | G06Q 30/0631 705/26.7 |
| 2014/0040069 A1* | 2/2014 | Tomasofsky | ........... | G06Q 30/06 705/26.8 |

\* cited by examiner

*Primary Examiner* — Yogesh C Garg
*Assistant Examiner* — Lalith Duraisamygurusamy
(74) *Attorney, Agent, or Firm* — Maschoff Brennan

(57) ABSTRACT

Method and system to enhance the presentation of a pinned resource is provided. Users may be provided with an option to enhance the presentation of a shared (or pinned) resource by attaching to it a visual control that indicates that the resource can represent an item of merchandise and that the resource is associated with functionality that would allow a user to purchase an item depicted in the pinned resource.

16 Claims, 4 Drawing Sheets

METHOD AND SYSTEM TO ENHANCE PRESENTATION OF A SHARED RESOURCE

TECHNICAL FIELD

This application relates to the technical fields of software and/or hardware technology and, in one example embodiment, to system and method to enhance presentation of a shared resource.

BACKGROUND

Some existing computer-implemented systems are designed to allow users to save images and categorize them on different web pages that may be termed boards. Users of such system can choose other users' boards based on their overlapping interests and follow those boards for new content. For example, one existing service facilitates pinboard-style social photo sharing by providing a website that allows users to create and manage theme-based image collections. These collections of images may be categorized based on events, interests, hobbies, etc. Users of snob website can browse other users' pinboards for inspiration, re-post (or 're-pin') images from other users' boards to their own collections or indicate that they like a particular image.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Method and system to enhance presentation of a shared resource are described. In the following description, for purposes of explanation, numerous specific details are set forth in order to provide a thorough understanding of an embodiment of the present invention. It will be evident however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

As mentioned above, an on-line service may be designed to facilitate pinboard-style social sharing of visual resources such as images or references to web sites. The sharing of visual resources may be accomplished by adding a resource to a user's web page that is intended to represent a virtual pin hoard. The operation of including a resource to a virtual pin board may be referred as pinning.

Users may be provided with an option to enhance the presentation of a shared (or pinned) resource by attaching to it a visual control that indicates that the resource can represent an item of merchandise and that the resource is associated with functionality that would allow a user to purchase an item depleted in the pinned resource. This functionality may be referred to as buy-it functionality. A visual control that indicates that the resource can be an item of merchandise may be referred to as a buy-it control.

For example, when an image is pinned on a user's virtual pinboard, the Uniform Resource Locator (URL) associated with the image is examined to determine whether it is associated with a seller. If so, the user is presented with an opportunity to enhance the image with buy-it functionality. This buy-it functionality may be exercised by the user to purchase the depicted item or it can also be provided as an option on the user's virtual pinboard, which would give other users an opportunity to purchase the depicted item. Method and system to enhance presentation of a shared resource may be implemented in the context of a network environment 100 illustrated in FIG. 1.

Figure 1:
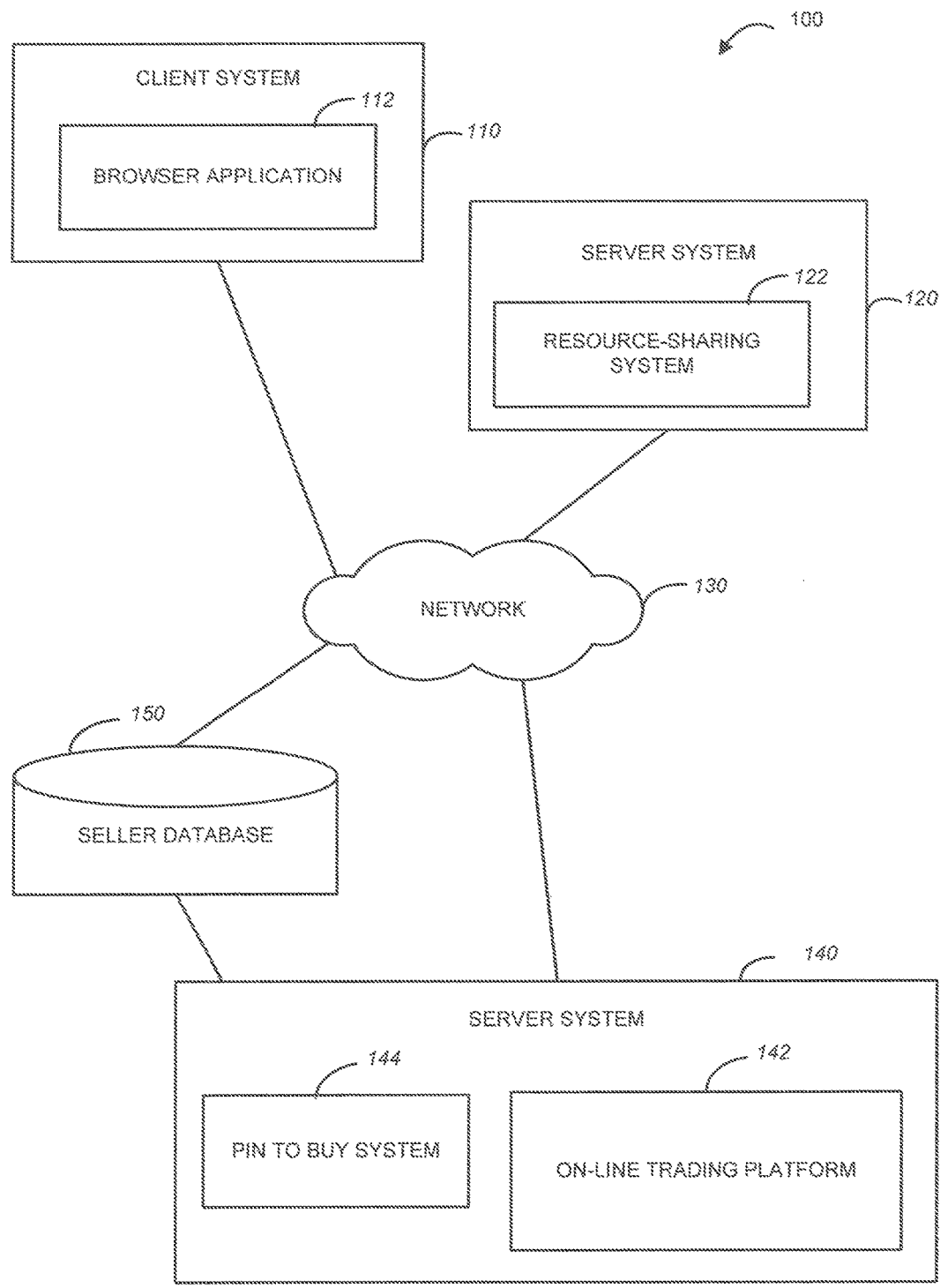
FIG. 1 is a diagrammatic representation of a network environment within which example method and system to enhance presentation of a shared resource may be implemented.

As shown in FIG. 1, the network environment 100 may include a client system 110, a server system 120, and a server system 140. The server system 120, in one example embodiment, may host an on-line social network service. For example, the server system 120 may host a resource-sharing system 122, which may be a pinboard-style social photo sharing service. The server system 140, in one example embodiment, may host an on-line trading platform 142.

The on-line trading platform 142 hosted by the server system 140, in one example embodiment, provides a place for buyers and sellers to come together and trade almost anything. In the context of one example on-line trading platform, a seller lists an item—most anything from antiques to cars, books to sporting goods. The seller chooses to either accept only bids for the item (an auction-type listing) or to offer the so-called "Buy It Now" option, which allows buyers to purchase the item right away at a fixed price. The client system 110 may execute a browser application 112, and may have access to the server system 120 and the server system 140 via a communications network 130. The communications network 130 may be a public network (e.g., the Internet, a mobile communication network, or any other network capable of communicating digital data). For example, the client system 110 may utilize the browser application 112 to access the resource-sharing system 122 and the on-line trading platform 142. When the browser application 112 is used to access the resource-sharing system 122, a virtual pinboard is presented to a user, where the user can share resources with other users, e.g., by pinning an image to the virtual pinboard.

A system to enhance presentation of a shared resource, such as an image pinned to a user's virtual pinboard, may be provided as a pin-to-buy system 144. As shown in FIG. 1, the pin-to-buy system 144 is resident on the server system 140. The pin-to-buy system 144 may be configured to detect that an image is pinned on a user's virtual pinboard, determine the URL associated with the image, and interrogate a seller database 150 with the determined URL. If the URL appears in the seller database 150, an inference is made that the pinned image depicts an item that is being offered for sale. The pin-to-buy system 144 may then present the user with an opportunity to enhance the pinned image with buy-it functionality. As mentioned above, the buy-it functionality may be exercised by the user to purchase the item depicted in the pinned image. The buy-it functionality may also be provided as an option on the user's virtual pinboard, which would give other users an opportunity to purchase the depicted item.

The pin-to-buy system 144 may be configured to communicate with the client system 110, e.g., via a widget or a browser plug-in. In some embodiments, the pin-to-buy system 144 may reside on the server 120 that hosts an on-line social network service that provides virtual pinboards to users and allows them to share resources by pinning images or references to web sites to their respective virtual pinboards. An example pin-to-buy system is illustrated in FIG. 2.

Figure 2:
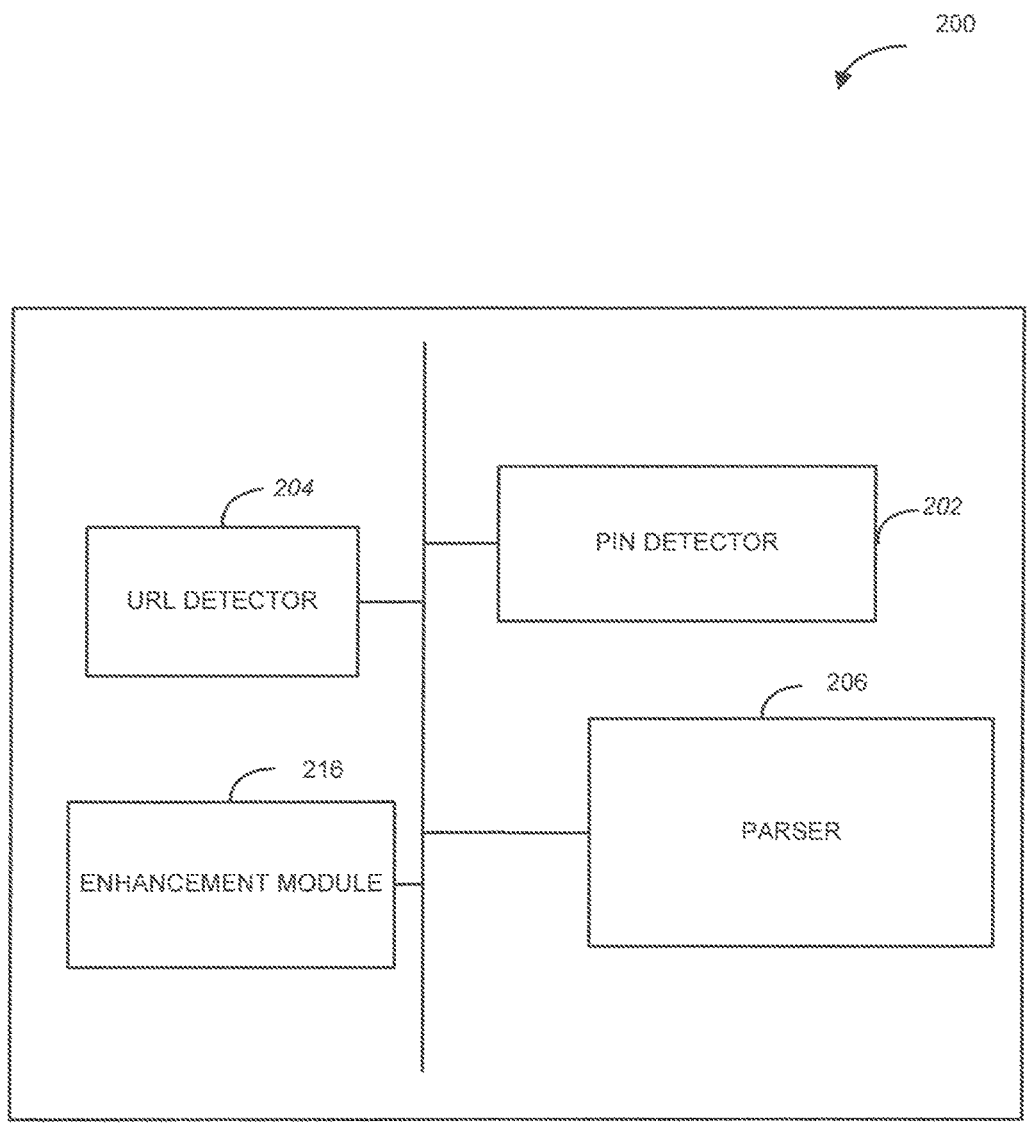
FIG. 2 is block diagram of a system to enhance presentation of a shared resource, in accordance with one example embodiment.

FIG. 2 is a block diagram of a pin-to-buy system 200 to enhance presentation of a shared resource, in accordance with one example embodiment. As shown in FIG. 2, the system 200 includes a pin detector 202, a URL detector 204, a parser 206, and an enhancement module 208. The pin detector 202 may be configured to detect that a resource is pinned on a user's virtual pinboard. The user's virtual pinboard is provided by an on-line social network service, such as, e.g., the resource-sharing system 122 of FIG. 2. A resource may be, e.g., an image or a reference to a web site. The URL detector 204 may be configured to access a URL associated with the resource. The parser 206 may be configured to determine that the URL is associated with a seller. The parser 206 makes this determination by interrogating a database that stores URLs utilized by sellers' web sites (such as, e.g., the seller database 150 of FIG. 1. The enhancement module 208 may be configured to enhance a pinned resource with buy-it functionality. The buy-it functionality permits the user to initiate a purchase of an item depicted in the resource. The user may also select to attach a merchandise indicator to the resource pinned on the user's virtual pinboard. A merchandise indicator, that is associated with functionality that lets a buyer purchase an item from a seller for a price the seller has set, may be in a form of a visual control such as a button. A merchandise indicator may be configured to only become visible when a user hovers a cursor over the associated image. Example operations performed by the system 200 can be described with reference to FIG. 3.

Figure 3:
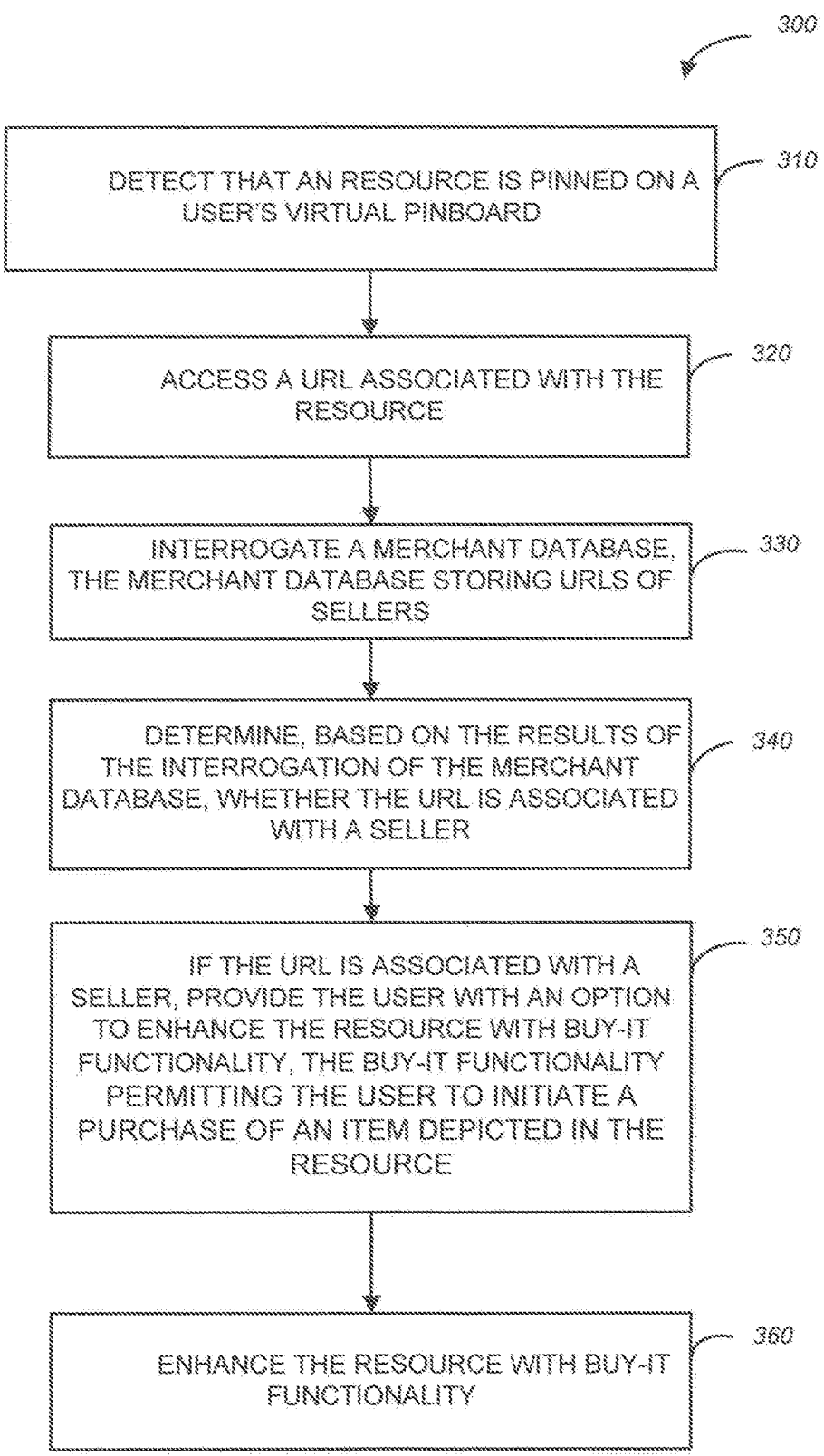
FIG. 3 is a flow chart of a method to enhance presentation of a shared resource, in accordance with an example embodiment.

FIG. 3 is a flow chart of a method 300 to enhance presentation of a shared resource, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when pin detector 202 of FIG. 2 detects that a resource is pinned on a user's virtual pinboard. At operation 320, the URL detector 204 of FIG. 2 accesses a URL associated with the resource, interrogates a seller database at operation 330, and determines, based on the results of the interrogation, whether the URL is associated with a seller, at operation 340. At operation 360, the enhancement module 208 of FIG. 2 enhances the pinned resource with the buy-it functionality, e.g., by adding a visual control to the resource.

Figure 4:
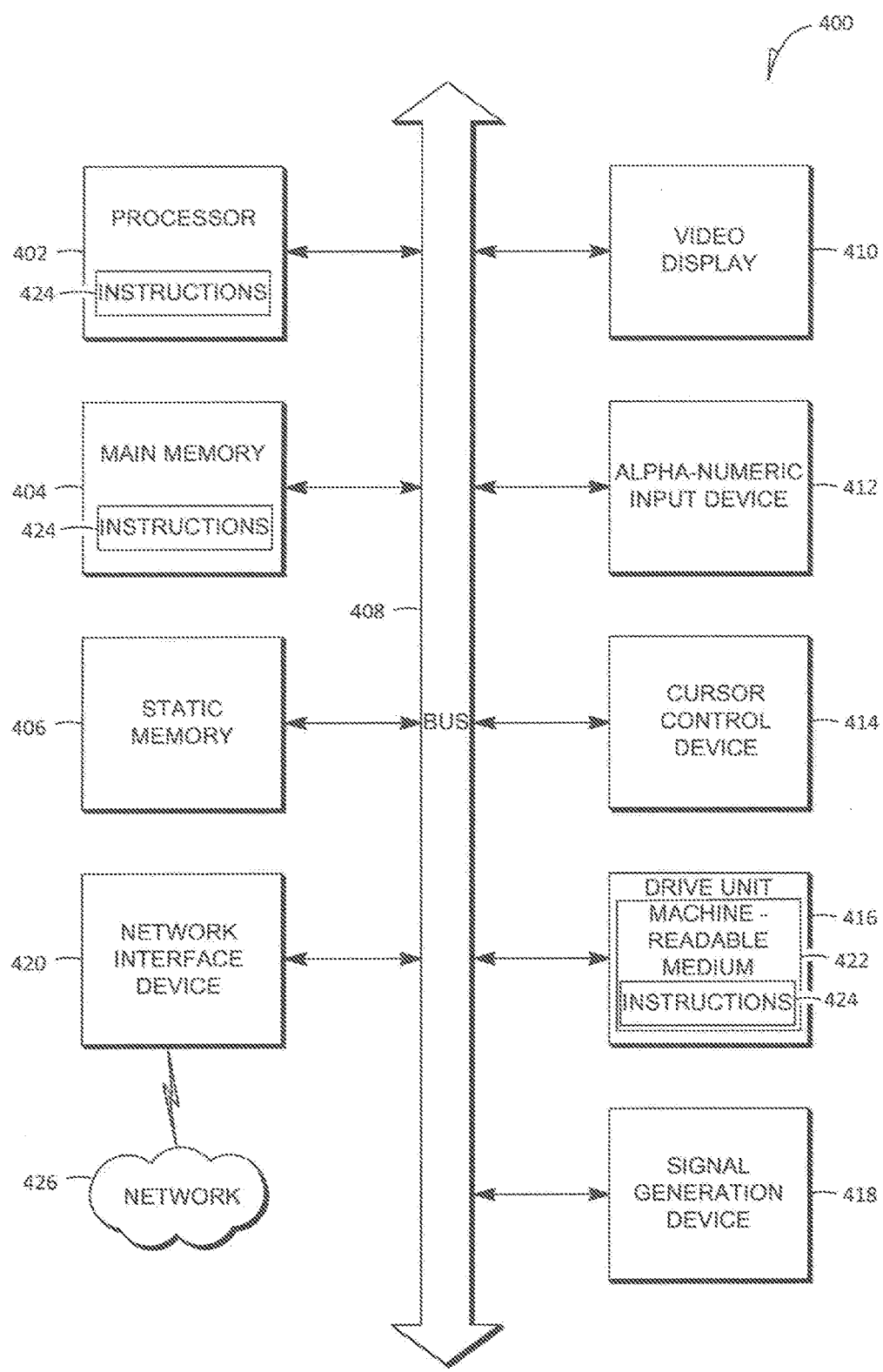
FIG. 4 is a diagrammatic representation of an example machine in the form of a computer system within which a set of instructions, for causing the machine to perform any one or more of the methodologies discussed herein, may be executed.

FIG. 4 shows a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term, "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured of instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to enhance the presentation of a pinned resource has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    detecting, by a server-processor, that a resource is pinned on a user's virtual pinboard provided by an on-line social network service, and wherein the resource lacks functionality that allows a user to purchase an item depicted in the pinned resource;
    accessing, by the server-processor, a Uniform Resource Locator (URL) associated with the resource previously pinned on the user's virtual pinboard;

interrogating, by the server-processor, a seller database associated with the resource previously pinned to the user's virtual pinboard; and in response to determining, by the server-processor, that the URL associated with the resource pinned to the user's virtual pinboard is stored in the seller database, causing presentation to a user of an option to enhance the resource with buy-it functionality that permits the user to initiate a purchase of the item, and enhancing the resource with buy-it functionality.

2. The method of claim 1, wherein the resource is an image.

3. The method of claim 1, wherein the resource is a web site reference.

4. The method of claim 1, wherein the method is executed at a server computer system hosting an on-line trading platform.

5. The method of claim 1, wherein the method is executed at a server computer system hosting an on-line social network service that provides the user's virtual pinboard.

6. The method of claim 1, wherein the buy-it functionality is configured to be exercised by the user to purchase an item represented in the resource.

7. The method of claim 1, wherein the enhancing of the resource with the buy-it functionality comprises attaching a merchandise indicator to the resource pinned on the user's virtual pinboard, the merchandise indicator associated with functionality that lets a buyer purchase an item from a seller for a price the seller has set.

8. The method of claim 7, comprising:
detecting an event associated with the merchandise indicator;
responsive to the event associated with the merchandise indicator, facilitating a purchase of the item depicted in the resource.

9. A computer-implemented system comprising:
a pin detector to detect, using a server-computer, that a resource is pinned on a user's virtual pinboard provided by an on-line social network service, and wherein the resource lacks functionality that allows a user to purchase an item depicted in the pinned resource;
a URL detector to access, using the server-computer, a Uniform Resource Locator (URL) associated with the resource previously pinned on the user's virtual pinboard;
a parser to, using the server-computer, interrogate a seller database associated with the resource previously pinned to the user's virtual pinboard; and
an enhancement module operating on the server-computer that, in response to the server-computer determining that the URL associated with the resource pinned to the user's virtual pinboard is stored in the seller database, causes presentation to a user of an option to enhance the resource with buy-it functionality that permits the user to initiate a purchase of the item, and enhancing the resource with buy-it functionality.

10. The system of claim 9, wherein the resource is an image.

11. The system of claim 9, wherein the resource is a web site reference.

12. The system of claim 9, wherein the pin detector, the URL detector, the parser, and the enhancement module reside at a server computer system hosting an on-line trading platform.

13. The system of claim 9, wherein the pin detector, the URL detector, the parser, and the enhancement module reside at a server computer system hosting an on-line social network service that provides the user's virtual pinboard.

14. The system of claim 9, wherein the buy-it functionality is be exercised by the user to purchase an item represented in the resource.

15. The system of claim 9, wherein the enhancement module is to attach a merchandise indicator to the resource pinned on the user's virtual pinboard, the merchandise indicator associated with functionality that lets a buyer purchase an item from a seller for a price the seller has set.

16. A machine-readable non-transitory storage medium having instruction data to cause a machine to perform operations comprising:
detecting, by a server-processor, that a resource is pinned on a user's virtual pinboard provided by an on-line social network service, and wherein the resource lacks functionality that allows a user to purchase an item depicted in the pinned resource;
accessing, by the server-processor, a Uniform Resource Locator (URL) associated with the resource previously pinned on the user's virtual pinboard;
interrogating, by the server-processor, a seller database associated with the resource previously pinned to the user's virtual pinboard; and
in response to determining, by the server-processor, that the URL associated with the resource pinned to the user's virtual pinboard is stored in the seller database, causing presentation to a user of an option to enhance the resource with buy-it functionality that permits the user to initiate a purchase of the item, and enhancing the resource with buy-it functionality.

* * * * *